(12) United States Patent
Suzuki

(10) Patent No.: US 7,223,955 B2
(45) Date of Patent: May 29, 2007

(54) SOLID-STATE IMAGING ELEMENT AND IMAGING DEVICE WITH DYNAMICALLY ADJUSTABLE SENSITIVITIES AND METHOD THEREOF

(75) Inventor: Nobuo Suzuki, Miyagi (JP)

(73) Assignee: FujiFilm Corporation, Minami-Ashigara-shi (JP)

(*) Notice: Subject to any disclaimer, the term of this patent is extended or adjusted under 35 U.S.C. 154(b) by 231 days.

(21) Appl. No.: 10/920,187

(22) Filed: Aug. 18, 2004

(65) Prior Publication Data

US 2005/0230774 A1    Oct. 20, 2005

(30) Foreign Application Priority Data

Aug. 25, 2003 (JP) .......................... P.2003-300066

(51) Int. Cl.
  H01L 27/00    (2006.01)
  H01L 31/00    (2006.01)
  H01L 27/148   (2006.01)
  H04N 3/14     (2006.01)

(52) U.S. Cl. .................. 250/208.1; 257/443; 257/215; 257/231; 348/302

(58) Field of Classification Search ............. 250/208.1, 250/226; 257/431, 432, 443, 440, 290–294, 257/215, 231; 348/303, 302, 294, 304, 311–324
See application file for complete search history.

(56) References Cited

U.S. PATENT DOCUMENTS 4,500,915 A * 2/1985 Koike et al. ................. 348/283
5,306,906 A * 4/1994 Aoki et al. ............... 250/208.1
6,320,593 B1 * 11/2001 Sobel et al. ................. 345/600

FOREIGN PATENT DOCUMENTS

| JP | 2000-069491 | * | 3/2000 |
| JP | 2000-69491 A | | 3/2000 |
| JP | 2000-316163 A | | 11/2000 |
| JP | 2001-8104 A | | 1/2001 |

* cited by examiner

Primary Examiner—Georgia Epps
Assistant Examiner—Pascal M. Bui-Pho
(74) Attorney, Agent, or Firm—Birch, Stewart, Kolasch & Birch, LLP

(57) ABSTRACT

A solid-state imaging element converts light intensity into an electric charge signal and stores the thus-converted electric charge signal through use of a plurality of photoelectric conversion elements arranged in a square lattice pattern on the surface of a semiconductor substrate in a row direction and a column direction. Vertical transfer sections transfer the electric charges from the first and second photoelectric conversion elements in the column direction. The vertical transfer section comprises a first electric charge reading region for reading electric charge from the first photoelectric conversion element to a vertical transfer channel; and a second electric charge reading region for reading electric charge from the second photoelectric conversion element. The first and second electric charge reading regions are provided at positions corresponding to a vertical transfer electrode, which are activated in difference phases.

13 Claims, 7 Drawing Sheets

FIG. 1
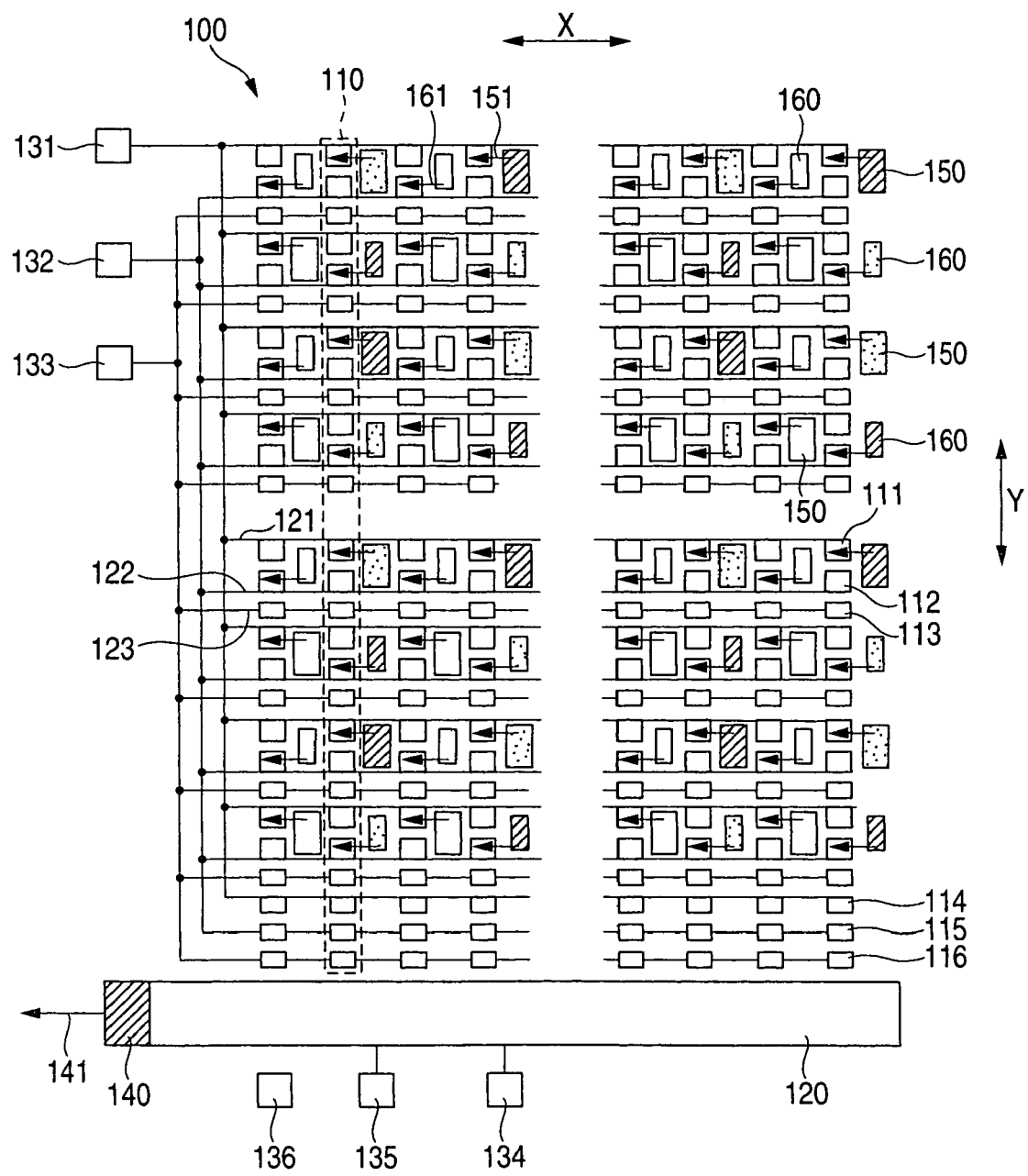
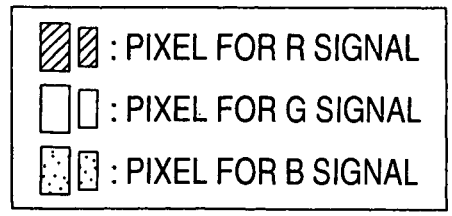

FIG. 6
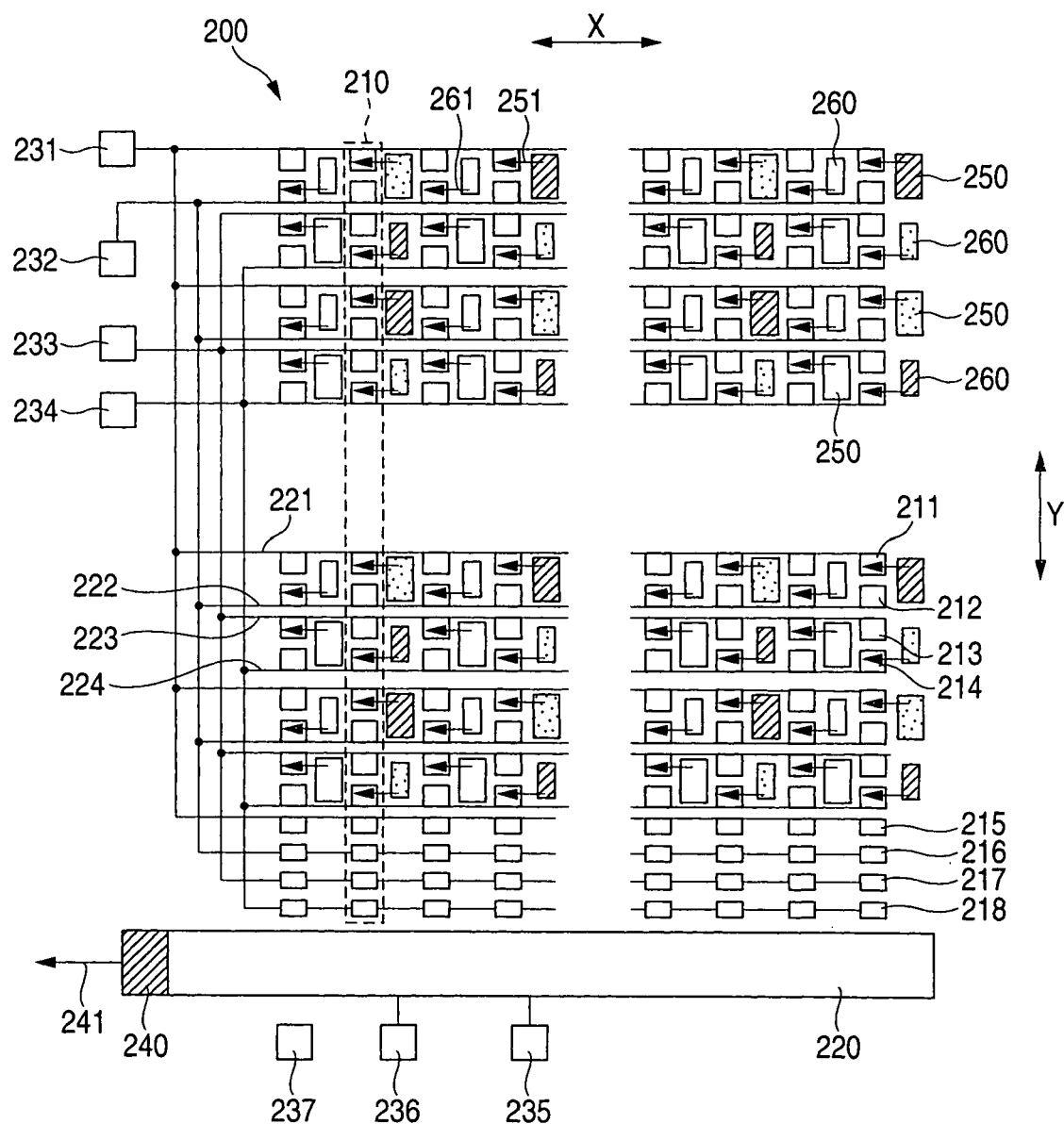
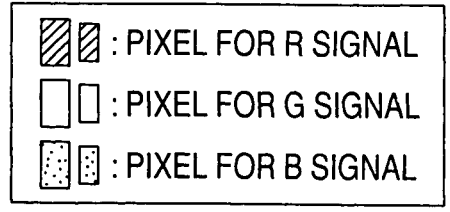

SOLID-STATE IMAGING ELEMENT AND IMAGING DEVICE WITH DYNAMICALLY ADJUSTABLE SENSITIVITIES AND METHOD THEREOF

This Nonprovisional application claims priority under 35 U.S.C. § 119(a) on Patent Application No(s). 2003-300066 filed in Japan on Aug. 25, 2003, the entire contents of which are hereby incorporated by reference.

BACKGROUND OF THE INVENTION

1. Field of the Invention

The present invention relates to a solid-state imaging element including a plurality of photoelectric conversion elements arranged in rows and columns orthogonal thereto on the surface of a semiconductor substrate, and to an imaging device equipped with such a solid-state imaging element.

2. Description of the Related Art

A solid-state imaging element utilized for a digital camera detects electric charges corresponding to an image signal by means of photoelectric conversion elements. For this reason, difficulty is usually encountered in broadening a dynamic range. In order to acquire an image having a wide dynamic range, there has been proposed utilization of a solid-state imaging element having photoelectric conversion elements of relatively high sensitivity (hereinafter sometimes described as "high-sensitivity pixels") and imaging elements of relatively low sensitivity (hereinafter sometimes described as "low-sensitivity pixels") (see JP-A-2000-69491, JP-A-2000-316163 and JP-A-2001-8104).

Photoelectric conversion signals having different sensitivities can be obtained by means of changing the area of an aperture of the photoelectric conversion element (see, e.g., JP-A-2001-8104); changing the light transmittance of a filter provided at a position above the photoelectric conversion element (see, e.g., JP-A-2000-69491 and JP-A-2000-316163); and changing the geometry of microlenses provided at a position above the photoelectric conversion elements (see, e.g., JP-A-2001-8104).

A sensitivity ratio between the high-sensitivity pixels and the low-sensitivity pixels, both pixels being provided in the solid-state imaging element described in JP-A-2000-69491, JP-A-2000-316163 and JP-A-2001-8104, is dependent on the structure of the solid-state imaging element and hence cannot be changed. For these reasons, the sensitivity ratio cannot be changed. Therefore, difficulty is encountered in performing photographing action with an optimum dynamic range in accordance with a scene.

SUMMARY OF THE INVENTION

The present invention has been conceived in light of the circumstances and aims at providing a solid-state imaging element which enables changing of a sensitivity ratio between a high-sensitivity pixel and a low-sensitivity pixel.

According a first aspect of the invention, there is provided a solid-state imaging element comprising: a semiconductor substrate; a plurality of photoelectric conversion elements forming a square lattice pattern extending in a column direction and in a row direction, wherein the square lattice pattern comprises a plurality of sets, each comprising a subset of said photoelectric conversion elements arranged in one of the column direction and the row direction, on a surface of the semiconductor substrate; a vertical transfer section that transfers to the column direction an electric charge from said photoelectric conversion elements, to form an electric charge from the vertical transfer section; a horizontal transfer section that transfers to the row direction the electric charge from the vertical transfer section, to form an electric charge transferred from the horizontal transfer section; and an output section that outputs a signal corresponding to the electric charge transferred from the horizontal transfer section; wherein the subsets of said photoelectric conversion elements comprise: a plurality of first photoelectric conversion elements that store a first signal electric charge, the first signal electric charge being used for obtaining an image signal having a comparatively higher sensitivity; and a plurality of second photoelectric conversion elements that store a second signal electric charge, the second signal electric charge being used for obtaining an image signal having a comparatively lower sensitivity; the vertical transfer section comprises: a plurality of vertical transfer channels in the semiconductor substrate, each of the vertical transfer channels corresponding to each of the subsets of said photoelectric conversion elements arranged in the column direction; a plurality of vertical transfer electrodes arranged to substantially cross the vertical transfer channels when viewed from a vertical direction to a plane of the semiconductor substrate; and a plurality of electric charge reading regions that read out to the vertical transfer channels, the electric charge from said photoelectric conversion elements; each of said photoelectric conversion elements corresponds to one of the vertical transfer electrodes; the plurality of the electric charge reading regions comprise: a plurality of first electric charge reading regions corresponding to the plurality of the first photoelectric conversion elements; and a plurality of second electric charge reading regions corresponding to the plurality of the second photoelectric conversion elements; and the vertical transfer electrodes comprises: a plurality of first vertical transfer electrodes corresponding to the first electric charge reading regions; and a plurality of second vertical transfer electrodes corresponding to the second electric charge reading regions, in which the first vertical transfer electrodes are positioned at positions different from the second vertical transfer electrodes.

According to the present invention, a timing at which the electric charges to be used for obtaining an image signal of relatively high sensitivity are to be read from the first photoelectric conversion elements to the vertical transfer channel and a timing at which the electric charges to be used for obtaining an image signal of relatively low sensitivity are to be read from the second photoelectric conversion elements to the vertical transfer channel can be controlled independently. Consequently, at least the time during which the electric charges are stored in said first photoelectric conversion elements or the time during which the electric charges are stored in said second photoelectric conversion elements can be changed by means of controlling drive pulses of said solid-state imaging element, and the sensitivity ratio of the image signal of high sensitivity to the image signal of low sensitivity based on the stored charges can be changed.

According to a second aspect of the invention, there is provided a solid-state imaging element as set forth in the first aspect of the invention, wherein a read pulse to be used for instructing reading of an electric charge within the plurality of electric charge reading regions includes an exposure time control pulse applied to ones of the first photoelectric conversion elements and the second photoelectric conversion elements; and the exposure time control pulse is for discharging, to the outside, an electric charge which have been stored in the plurality of photoelectric conversion elements before appearance of the exposure time control pulse, by way of the vertical transfer channels. According to the present invention, at least either a point in time when storage of electric charge into the first photoelectric conversion elements is started or a point in time when storage of electric charge into the second photoelectric conversion elements is started can be controlled. Hence, the sensitivity of an image signal of high sensitivity or that of an image signal of low sensitivity can be controlled, and the sensitivity ratio between these signals can be controlled.

According to a third aspect of the invention, there is provided a solid-state imaging element as set forth in the first aspect of the invention, wherein a read pulse to be used for instructing reading of an electric charge within the plurality of electric charge reading regions includes: a first exposure time control pulse for performing reading operation in the plurality of first photoelectric conversion elements; and a second exposure time control pulse for performing reading operation in the plurality of second photoelectric conversion elements, in which the first and second exposure time control pulses appear at different times, and wherein the first exposure time control pulse is for reading, into the vertical transfer channels, an electric charge which have been stored in the plurality of first photoelectric conversion elements before appearance of the first exposure time control pulse, as the first signal electric charge; and the second exposure time control pulse is for reading, into the vertical transfer channels, an electric charge which have been stored in the plurality of second photoelectric conversion elements before appearance of the second exposure time control pulse, as the second signal electric charge. According to the present invention, at least either a point in time when storage of electric charge into the first photoelectric conversion elements is completed or a point in time when storage of electric charge into the second photoelectric conversion elements is completed can be controlled. Hence, the sensitivity of an image signal of high sensitivity or that of an image signal of low sensitivity can be controlled, and the sensitivity ratio between these signals can be controlled.

According to a fourth aspect of the invention, there is provided a solid-state imaging element as set forth in the first aspect of the invention, wherein ones of the first photoelectric conversion elements and the second photoelectric conversion elements are arranged in a checked pattern, when viewed from a vertical direction to a plane of the semiconductor substrate. As a result of utilization of the solid-state imaging element, when image signals output from the adjacent first and second photoelectric conversion elements are merged, a resultantly-merged signal can be deemed as a single pixel located at the centroid of two pixels. Hence there is an obtained image signal arranged in a virtually-checked pattern. Consequently, a dynamic range can be broadened without involvement of a substantial reduction in the resolution in both longitudinal and lateral directions.

According to a fifth aspect of the invention, there is provided a solid-state imaging element as set forth in the first aspect of the invention, wherein the first photoelectric conversion element and the second photoelectric conversion element which are adjacent to each other with the same positional relationship possess an identical relative spectral sensitivity characteristic. Acquisition of a color image can be performed readily by means of setting the spectral sensitivity characteristics of the photoelectric conversion elements in this way.

According to a sixth aspect of the invention, there is provided a solid-state imaging element comprising: a semiconductor substrate; a plurality of photoelectric conversion elements forming a square lattice pattern extending in a column direction and in a row direction, wherein the square lattice pattern comprises a plurality of sets, each comprising a subset of said photoelectric conversion elements arranged in one of the column direction and the row direction, on a surface of the semiconductor-substrate; a vertical transfer section that transfers to the column direction an electric charge from said photoelectric conversion elements, to form an electric charge from the vertical transfer section; a horizontal transfer section that transfers to the row direction the electric charge from the vertical transfer section, to form an electric charge transferred from the horizontal transfer section; and an output section that outputs a signal corresponding to the electric charge transferred from the horizontal transfer section; where in the subsets of the plurality of photoelectric conversion elements comprise: a plurality of first photoelectric conversion elements that store a first signal electric charge, the first signal electric charge being used for obtaining an image signal having a comparatively higher sensitivity; and a plurality of second photoelectric conversion elements that store a second signal electric charge, the second signal electric charge being used for obtaining an image signal having a comparatively lower sensitivity; the plurality of first photoelectric conversion elements form a first square lattice pattern extending in the column direction and in the row direction; the plurality of second photoelectric conversion elements form a second square lattice pattern extending in the column direction and in the row direction; the plurality of first photoelectric conversion elements and the plurality of second photoelectric conversion elements are arranged at a common pitch in the first square lattice pattern and the second square lattice pattern, respectively; the plurality of first photoelectric conversion elements and the plurality of second photoelectric conversion elements are shifted each other by half of the pitch in both the column direction and the row direction; the vertical transfer section comprises: a plurality of vertical transfer channels in the semiconductor substrate, each of the vertical transfer channels corresponding to each of the subsets of said photoelectric conversion elements arranged in the column direction; a plurality of vertical transfer electrodes arranged to substantially cross the vertical transfer channels when viewed from a vertical direction to a plane of the semiconductor substrate; and a plurality of electric charge reading regions that read out to the vertical transfer channels, the electric charge from said photoelectric conversion elements; each of the vertical transfer channels assumes a shape which wholly extends in a meandering pattern in the column direction between the photoelectric conversion elements; each of the photoelectric conversion elements corresponds to one of the vertical transfer electrodes, each of the vertical transfer electrodes assuming a shape which wholly extends in a meandering pattern in the row direction between the photoelectric conversion elements; the plurality of the electric charge reading regions comprise: a plurality of first electric charge reading regions corresponding to the plurality of the first photoelectric conversion elements; and a plurality of second electric charge reading regions corresponding to the plurality of the second photoelectric conversion elements and; the vertical transfer electrodes comprises: a plurality of first vertical transfer electrodes corresponding to the first electric charge reading regions; and a plurality of second vertical transfer electrodes corresponding to the second electric charge reading regions, in which the first vertical transfer electrodes are positioned at positions different from the second vertical transfer electrodes.

According to the present invention, in a solid-state imaging element in which photoelectric conversion elements are arranged in a so-called honeycomb arrangement, a timing at which the electric charge to be used for obtaining an image signal of relatively high sensitivity are to be read from the first photoelectric conversion elements to the vertical transfer channel and a timing at which the electric charge to be used for obtaining an image signal of relatively low sensitivity are to be read from the second photoelectric conversion elements to the vertical transfer channel can be controlled independently. Consequently, at least the time during which the electric charge is stored in said first photoelectric conversion elements or the time during which the electric charge is stored in said second photoelectric conversion elements can be changed by means of controlling drive pulses of said solid-state imaging element, and the sensitivity ratio of the image signal of high sensitivity to the image signal of low sensitivity based on the stored charges can be changed.

According to a seventh aspect of the invention, there is provided a solid-state imaging element as set forth in the sixth aspect of the invention, wherein a read pulse to be used for instructing reading of an electric charge within the plurality of the electric charge reading regions includes a first exposure time control pulse applied to the first photoelectric conversion elements and a second exposure time control pulse applied to the second photoelectric conversion elements in which appearance timings of the first exposure time control pulse and the second exposure time control pulse change in accordance with an imaging scene; each of the first and second exposure time control pulses is for discharging, to the outside, an electric charge which have been stored in the plurality of photoelectric conversion elements before appearance of the exposure time control pulse, by way of the vertical transfer channels. According to the present invention, in a solid-state imaging element in which photoelectric conversion elements are arranged in a so-called honeycomb arrangement, at least either a point in time when storage of electric charge into the first photoelectric conversion elements is started or a point in time when storage of electric charge into the second photoelectric conversion elements is started can be controlled. Hence, the sensitivity of an image signal of high sensitivity or that of an image signal of low sensitivity can be controlled, and the sensitivity ratio between these signals can be controlled.

According to an eighth aspect of the invention, there is provided a solid-state imaging element as set forth in the sixth aspect of the invention, wherein the first exposure time control pulse is for reading, into the vertical transfer channels, an electric charge which have been stored in the plurality of first photoelectric conversion elements before appearance of the first exposure time control pulse, as the first signal electric charge; and the second exposure time control pulse is for reading, into the vertical transfer channels, an electric charge which have been stored in the plurality of second photoelectric conversion elements before appearance of the second exposure time control pulse, as the second signal electric charge. According to the present invention, in a solid-state imaging element in which photoelectric conversion elements are arranged in a so-called honeycomb arrangement, at least either a point in time when storage of electric charge into the first photoelectric conversion elements is completed or a point in time when storage of electric charge into the second photoelectric conversion elements is completed can be controlled. Hence, the sensitivity of an image signal of high sensitivity or that of an image signal of low sensitivity can be controlled, and the sensitivity ratio between these signals can be controlled.

According to a ninth aspect of the invention, there is provided a solid-state imaging element as set forth in the sixth aspect of the invention, wherein the first photoelectric conversion element and the second photoelectric conversion element which are adjacent to each other with the same positional relationship possess an identical relative spectral sensitivity characteristic.

According to a tenth aspect of the invention, there is provided an imaging device comprising: a solid-state imaging element as set forth in the first or sixth aspect of the invention; an exposure time control section that changes an exposure time of the first photoelectric conversion elements and an exposure time of the second photoelectric conversion elements; and a signal processing section that processes a signal on the basis of an imaging signal output from the solid-state imaging element, wherein signal processing to be performed by the signal processing section includes merging operation for generating a composite signal of a high sensitivity image signal originating from a signal output from the first photoelectric conversion element and a low sensitivity image signal originating from a signal output from the second photoelectric conversion element; and the exposure time control section determines a type of a photographing scene and changes the exposure time of the first photoelectric conversion element and the exposure time of the second photoelectric conversion element by makeing a timing at which an electric charge is to be read to the vertical transfer channels from the first photoelectric conversion elements different from a timing at which an electric charge is to be read to the vertical transfer channels from the second photoelectric conversion.

According to the present invention, an image having a superior wide dynamic range can be obtained by means of changing the sensitivity ratio of the image signal of high sensitivity to the image signal of low sensitivity according to a photographing scene.

According to a eleventh aspect of the invention, there is provided an imaging device, wherein the exposure time control section obtains a brightness distribution of the photographing scene and determines the type of the photographing scene based on the determined brightness distribution.

BRIEF DESCRIPTION OF THE DRAWINGS

FIG. 1 is a view showing the schematic configuration of a solid-state imaging element according to a first embodiment of the present invention;

FIG. 6 is a view showing the schematic configuration of a solid-state imaging element according to a second embodiment of the present invention.

DETAILED DESCRIPTION OF THE INVENTION

Figure 2:
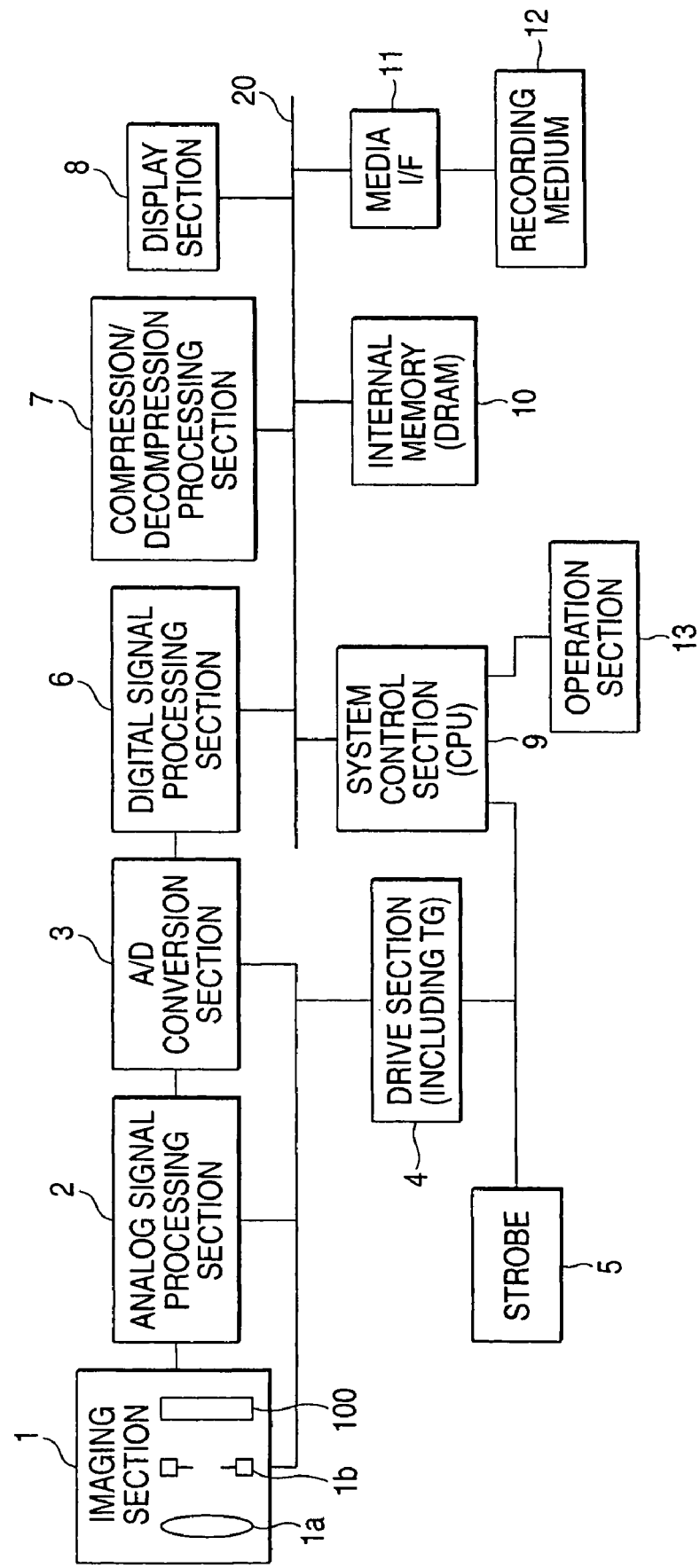
FIG. 2 is a view showing the schematic configuration of a digital camera of the present embodiment.

Embodiments of the present invention will be described hereinbelow by reference to the drawings.

(First Embodiment)

FIG. 1 shows the substantial configuration of a solid-state imaging element according to a first embodiment of the present invention. A solid-state imaging element 100 shown in FIG. 1 is for converting light intensity into an electric charge signal and storing the thus-converted electric charge signal through use of a plurality of photoelectric conversion elements 150, 160 (only some of them shown in FIG. 1 are labeled with reference numerals, and they may sometimes be described as "pixels" hereinbelow) arranged in a square lattice pattern on the surface of a semiconductor substrate in the direction of a row (i.e., an X direction in FIG. 1) and the direction of a column (i.e., a Y direction in FIG. 1). The solid-state imaging element 100 comprises a vertical transfer section 110 (only a part of them shown in FIG. 1 is labeled with reference numerals) for transferring the electric charges output from the photoelectric conversion elements 150, 160 in the direction of a column; a horizontal transfer section 120 for transferring the electric charges output from the vertical transfer section 110 in the direction of a row; and an output section 140 for outputting a signal 141 corresponding to the electric charge transferred by the horizontal transfer section 120.

The first photoelectric conversion elements 150 are for storing signal electric charges to be used for acquiring an image signal of relatively high sensitivity and are arranged in a checkered pattern. The second photoelectric conversion elements 160 are for storing signal electric charges to be used for acquiring an image signal of relatively low sensitivity and are arranged in a checkered pattern at positions where the first photoelectric conversion elements 150 are arranged. The first photoelectric conversion elements 150 have higher photoelectric conversion sensitivity than do the second photoelectric conversion elements 160. The photoelectric conversion sensitivity may be changed by means of changing the areas of light-receiving surfaces of the photoelectric conversion elements or a light-gathering area through use of microlenses provided at positions higher than the photoelectric conversion elements. These methods have already been known, and hence their explanations are omitted. In the embodiment shown in FIG. 1, although a difference exists between the first photoelectric conversion elements 150 and the second photoelectric conversion elements 160 in terms of photoelectric conversion sensitivity, in consideration of the area efficiency of the element, the first and second photoelectric conversion elements 150, 160 may have identical photoelectric conversion sensitivities. When identical photoelectric conversion sensitivities are adopted, design and manufacturing operations are simplified.

In order to detect a color image signal, the solid-state imaging element 100 shown in FIG. 1 has color filters (not shown) provided at a position higher than the first and second photoelectric conversion elements 150, 160. A method for arranging the color filters is arbitrary, but the same color is assigned to the first and second photoelectric conversion elements 150, 160 positioned adjacent to each other while maintaining the same positional relationship. In FIG. 1, the solid-state imaging element 100 has three color filters; that is, R (red), G (green), and B (blue), and the filters store electric charges corresponding to red light, green light, and blue light.

The vertical transfer section 110 transfers the electric charges from the first and second photoelectric conversion elements 150, 160 in the direction of a column. The vertical transfer section 110 comprises a plurality of vertical transfer channels (not shown) formed in the semiconductor substrate; a plurality of vertical transfer electrodes 111 to 113 formed in a layer above the vertical transfer channels; first electric charge reading regions 151 for reading the electric charges of the first photoelectric conversion elements 150 into the vertical transfer channel (diagrammatically indicated by an arrow in FIG. 1); and second electric charge reading regions 161 for reading the electric charges of the second photoelectric conversion elements 160 into the vertical transfer channel (diagrammatically indicated by the arrow in FIG. 1).

The vertical transfer channel is a linear region of a given width which extends in the direction of a column beside the first and second photoelectric conversion elements 150, 160. The vertical transfer electrodes 111 through 113 formed in the layer above the vertical transfer channel divide regions where the electric charges are transferred and stored. The three vertical transfer electrodes 111 through 113 are provided so as to correspond to the first and second photoelectric conversion elements 150, 160 (in FIG. 1, only the first and second photoelectric conversion elements corresponding to the vertical transfer electrodes 111 through 113 located in one column are labeled with the reference numerals). The vertical transfer electrodes located, while maintaining the same positional relationship, within a single row of photoelectric conversion elements are electrically connected together by means of electrode wires 121 through 123 (in FIG. 1, only the electrode wires corresponding to the vertical transfer electrodes 111 through 113 located in one column are labeled with the reference numerals). The vertical transfer electrodes 111 through 113 are formed from polycrystalline silicon or the like.

Vertical transfer pulses of three phases are applied to the vertical transfer electrodes 111 through 113 by way of terminals 131 through 133, and the electric charges stored in the vertical transfer channel are transferred in the direction of a column. The vertical transfer pulses are also applied to transfer electrodes 114 through 116 existing between the vertical transfer section 110 and the horizontal transfer section 120. The electric charges detected by the first and second photoelectric conversion elements 150, 160 located in one row are transferred to the horizontal transfer section 120 every cycle of a vertical transfer pulse.

The first electric charge reading regions 151 are provided at positions corresponding to the vertical transfer electrodes 111. Reading of electric charges from the first photoelectric conversion elements 150 to the vertical transfer channel is performed by means of superimposing a read pulse on a vertical transfer pulse of first phase to be applied to the terminals 131. The second electric charge reading regions 161 are provided at positions corresponding to the vertical transfer electrode 112. Reading of electric charges from the second photoelectric conversion elements 160 to the vertical transfer channel is performed by means of superimposing the read pulse on the vertical transfer pulse of second phase to be applied to the terminals 132. Therefore, a timing at which the electric charges are to be read from the first photoelectric conversion elements 150 to the vertical transfer channel and a timing at which the electric charges are to be read from the second photoelectric conversion elements 160 to the vertical transfer channel can be controlled independently.

The horizontal transfer section 120 transfers the electric charges from the vertical transfer section 110 in the direction of a row and includes a horizontal transfer channel and a horizontal transfer electrode (neither of which is shown). Horizontal transfer pulses of two phases are applied to the horizontal transfer electrode by way of terminals 134, 135. The signal electric charges that are from the photoelectric conversion elements 150, 160 provided in one row and have been transferred from the vertical transfer section 110 are transferred to the output section 140. The output section 140 has a floating diffusion amplifier configuration and outputs the voltage signal 141 corresponding to the transferred electric charge.

The solid-state imaging element 100 shown in FIG. 1 has an overflow drain region (not shown) which discharges the electric charges stored in the photoelectric conversion elements 150, 160. When the discharged pulse is applied to an overflow drain electrode terminal 136, the electric charges stored in the photoelectric conversion elements 150, 160 are discharged to the semiconductor substrate. A pulse is applied to the overflow drain electrode terminal 136 at a predetermined timing in response to operation of a release button, thereby controlling a time during which the electric charges are stored in the photoelectric conversion elements 150, 160.

Although not shown in FIG. 1, a channel stopper is formed between the vertical transfer channels. Although illustrated in FIG. 1 as being comparable in size with the first and second photoelectric conversion elements 150, 160, the vertical transfer electrodes 111 through 113 are actually much smaller.

FIG. 2 is a view showing a schematic configuration of a digital camera according to the first embodiment of the present invention. The digital camera shown in FIG. 2 comprises an imaging section 1; an analog signal processing section 2; an analog-to-digital conversion section 3; a drive section 4; a strobe 5; a digital signal processing section 6; a compression/decompression processing section 7; a display section 8; a system control section 9; internal memory 10; a media interface 11; a recording medium 12; and an operation section 13. The digital signal processing section 6, the compression/decompression processing section 7, the display section 8, the system control section 9, the internal memory 10, and the media interface 11 are connected to a system bus 20.

The imaging section 1 includes an optical system, such as a photographing lens 1*a*, and the solid-state imaging element 100; photographs a subject; and outputs an analog image pickup signal. The image pickup signal acquired by the imaging section 1 is sent to the analog signal processing section 2, where the signal is subjected to predetermined analog signal processing. The signal is further converted into a digital signal in the analog-to-digital conversion section 3 and then transferred to the digital signal processing section 6 as so-called RAW image data. The RAW image data correspond to digital image data into which the image pickup signal output from the imaging section 1 is converted while the format of the image pickup signal remains intact.

At the time of photographing operation, the imaging section 1 is controlled by way of the drive section 4. The solid-state imaging element 100 outputs an analogue voltage signal derived from a signal electric charge which has been generated in response to incident light and accumulated. The solid-state imaging element 100 is activated at predetermined timing by a drive signal output from a timing generator (described as TG in FIG. 2) included in the drive section 4, while taking, as a trigger, activation of a release switch resulting from operation of a release button (not shown) which is a part of the operation section 13. The drive section 4 outputs a predetermined drive signal under control of the system control section 9, as well as outputting a drive signal to a mechanical shutter 1*b* and a drive signal to the analog signal processing section 2 and the analog-to-digital conversion processing section 3.

The strobe 5 operates when the brightness of the subject is a predetermined value or less, and is controlled by the system control section 9.

The digital signal processing section 6 subjects the digital image data output from the analog-to-digital conversion section 3 to digital signal processing in accordance with an operating mode set by the operation section 13. Processing to be performed by the digital signal processing section 6 comprises black level correction processing (OB processing); linear matrix correction processing (i.e., correction processing for eliminating, from an original color signal output from the imaging section, a color mixture component stemming from a photoelectric conversion characteristic of the imaging element). Processing is effected by means of subjecting an RGB input to 3×3 matrix computation; white balance adjustment processing (gain adjustment); gamma correction processing; image composition processing; synchronization processing; Y/C conversion processing; or the like. The image composition processing performed by the digital signal processing section 6 will be described later.

The digital signal processing section 6 is constituted of, e.g., a DSP (digital signal processor). The compression/decompression section 7 subjects Y/C data obtained from the digital signal processing section 6 to compression processing, as well as subjecting the compressed image data obtained from the recording medium 12 to decompression processing.

The display section 8 is constituted with inclusion of, e.g., an LCD device, and displays an image based on image data which have been captured through photographing and undergone digital signal processing. The display section 8 also displays an image based on the image data obtained by decompression of the compressed image data recorded on a recording medium. Moreover, the display section 8 can display a through image captured at the time of photographing operation and information about statuses and operation of the digital camera.

The internal memory 10 is, e.g., DRAM, and is utilized as work memory for the digital signal processing section 6 and the system processing section 9. The internal memory 10 is also utilized as buffer memory for temporarily storing photographed image data to be recorded on the recording medium 12 and buffer memory for storing display image data to be sent to the display section 8. The media interface 11 performs input and output of data to and from the recording medium 12, such as a memory card.

Brightness Distribution Determination

The system control section 9 controls operations of the entire digital camera including photographing operation. Specifically, the system control section 9 is primarily constituted of a processor which operates in accordance with a predetermined program. Processing to be performed by the system control section 9 includes scene determination processing for determining the type of a photographing scene; and exposure time control processing for changing an exposure time of the first photoelectric conversion element or an exposure time of the second photoelectric conversion element by means of changing a timing at which electric charges are to be read from the first or second photoelectric conversion element to the vertical transfer channel in accordance with the type of a determined scene.

The operation section 13 performs various kinds of operations required when the digital camera is in use and sets an operation mode of a digital camera (a photographing mode, a playback mode, or the like), and a photographing method and condition at the time of photographing operation. Although the operation section 13 may be provided with an operation member corresponding to respective functions, the operation section 13 may share the operation member in conjunction with displaying operation of the display section 8. The operation section 13 includes a release button to be used for starting photographing operation.

Figure 3:
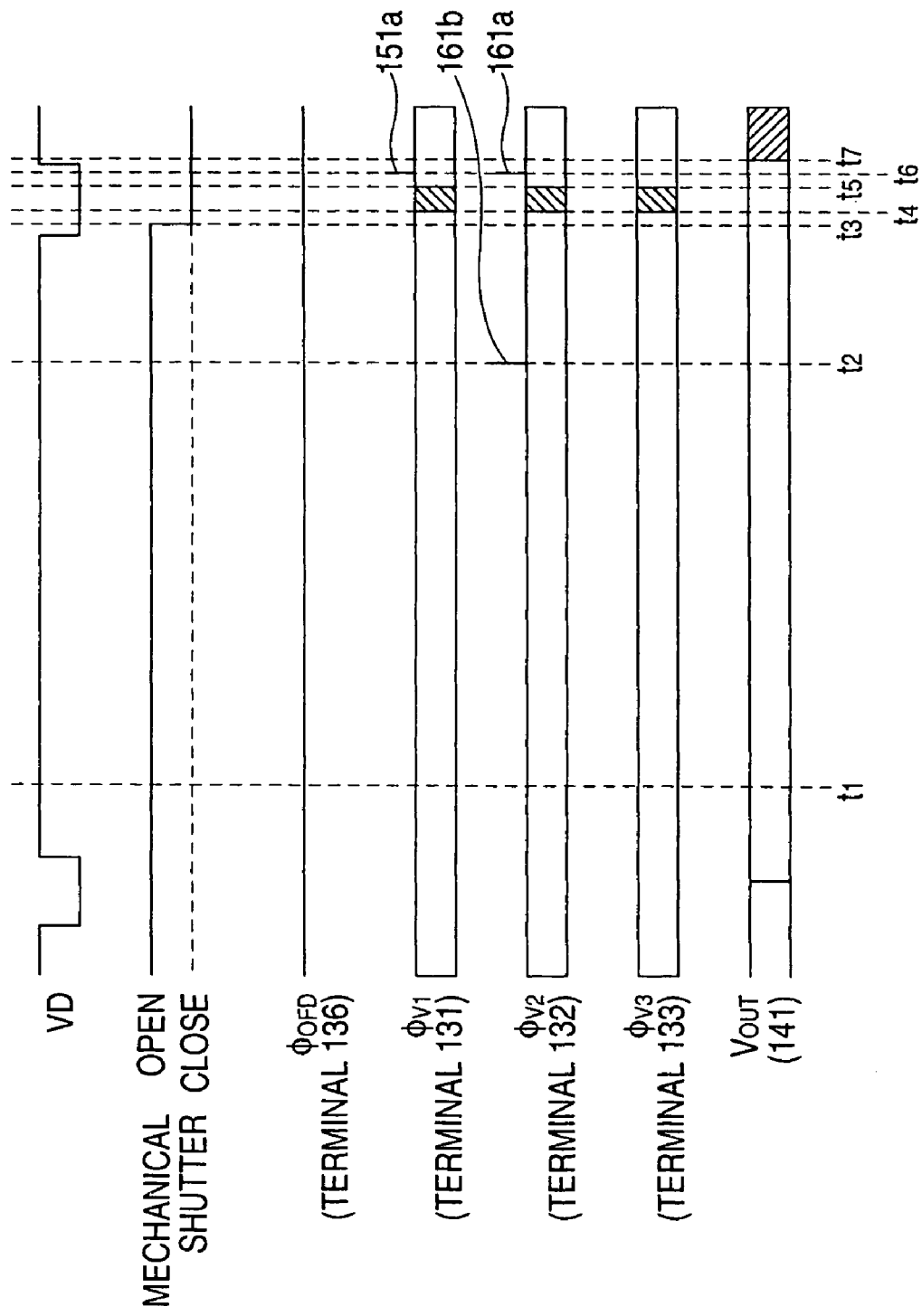
FIG. 3 is a view showing a timing chart for describing example activation of the solid-state imaging element of the present invention.

Activation of the solid-state imaging element 100 will now be described. FIG. 3 shows a timing chart for describing activation of the solid-state imaging element 100. FIG. 3 shows a vertical synchronous signal VD; an overflow drain pulse $\phi_{OFD}$ (hereinafter described as an "OFD pulse") to be applied to the terminal 136; a drive pulse $\phi_{v1}$ to be applied to the terminal 131; a drive pulse $\phi_{v2}$ to be applied to the terminal 132; a drive pulse $\phi_{v3}$ to be applied to the terminal 133; an output signal $V_{out}$; and an open/close state of the mechanical shutter. This embodiment shows a case where a ratio of the photoelectric conversion sensitivity of the first photoelectric conversion element 150 to that of the second photoelectric conversion element 160 is set to 4:1 and where settings are made such that an image signal is acquired by taking the ratio of the sensitivity of an image signal of high sensitivity to that of a low-sensitivity signal as 16:1.

When the release button (not shown) of the operation section 13 is pressed, the OFD pulse $\phi_{OFD}$ is applied to a terminal 136 at time t1 after setting of an exposure and autofocus control have been performed. The electric charges that have been stored thus far in the first photoelectric conversion element 150 and the electric charges that have been stored thus far in the second photoelectric conversion element 160 are discharged. Storage of the electric charges corresponding to the incident light is then commenced. During this period, vertical transfer pulses of first through third phases are periodically applied to the terminals 131 through 133. A read pulse 161b is superimposed on the vertical transfer pulse of second phase at time t2, wherein the read pulse 161b instructs the second photoelectric conversion element 160 to read electric charges to the vertical transfer channel. The read pulse 161b is an exposure time control pulse for changing the exposure time of the second photoelectric conversion element 160 with respect to the exposure time of the first photoelectric conversion element 150. The electric charges stored in the second photoelectric conversion element 160 are again discharged at time t2. Therefore, the second photoelectric conversion element 160 again starts storing electric charges at time t2.

In this embodiment, as a result of the exposure time of the first photoelectric conversion element 150 being made equal to that of the second photoelectric conversion element 160, the sensitivity ratio between the image signal of high sensitivity and the image signal of low sensitivity assumes 4:1. Hence, in order to set the sensitivity ratio between the image signal of high sensitivity and the image signal of low sensitivity to 16:1, the exposure time of the second photoelectric conversion element 160 is set to one-quarter the exposure time of the first photoelectric conversion element 150. Specifically, the exposure time of the first photoelectric conversion element 150 is a time duration from time t1 to time t3 at which the mechanical shutter is closed. Time t2 is determined such that a time duration from time t2 to time t3 becomes one-quarter the time duration from time t1 to time t3.

When the mechanical shutter is closed at time t3, storage of the electric charges in the first and second photoelectric conversion elements 150, 160 is stopped. At this point in time, the signal charges of 16:1 are stored in the first and second photoelectric conversion elements 150, 160. This value is for a case where the storage signal electric charges do not exceed a saturate storage amount of the first photoelectric conversion element 150 and that of the second photoelectric conversion element 160. In reality, there are many cases where the electric charges exceed the saturated storage amount of the first photoelectric conversion element 150, thereby varying the actual amount of stored electric charges.

Subsequently, the electric charges remaining in the vertical transfer channel are discharged at time t4. Hence, application of a vertical transfer pulse whose frequency is sufficiently higher than that used during normal operation is commenced. When the high-speed vertical transfer pulse is applied until time t5, substantially no electric charges remain in the vertical transfer channel.

After application of the high-speed vertical transfer pulse has been stopped, at time t6, read pulses 151a of first phase are superimposed on the vertical transfer pulses of first phase, and second phase read pulses 161a are superimposed on the vertical transfer pulses of second phase. The first phase read pulses 151a and the second phase read pulses 161a are super imposed on the vertical transfer pulses of identical cycle, but not at strictly the same time.

When the first phase read pulses 151a and the second phase read pulses 161a have been applied to the vertical transfer pulses, the signal electric charges stored in the first photoelectric transfer element 150 and those stored in the second photoelectric transfer element 160 are read to the vertical transfer channels. When the signal electric charges are transferred by means of the vertical transfer pulses of an ordinary frequency and the signal electric charges corresponding to one row are transferred to the horizontal transfer section 120, the signal electric charges are horizontally transferred by means of the horizontal transfer pulses (not shown), delivered to the output section 140, and sent to the analog signal processing section 2 as an output signal $V_{out}$. Such transfer operation is repeated until all the signal electric charges read to the vertical transfer channel are sent to the output section 140.

The output signal $V_{out}$ is an unwanted signal at time t7, by which time the signal electric charges have already been read to the vertical transfer channel (at time t6). Horizontal transfer pulses existing until the signal electric charges read to the vertical transfer channel at time t6 are transferred to the horizontal transfer section may be stopped, and the unwanted signal electric charges may be discharged to the drain section provided in the horizontal transfer section 120.

Signal composition processing of the digital signal processing section 6 will now be described. The digital signal processing section 6 subjects the high-sensitivity image data derived from the electric charges stored in the first photoelectric conversion element 150 and the low-sensitivity image data derived the electric charges stored in the second photoelectric conversion element 160 to OB processing, linear matrix correction processing, white balance adjustment processing, and gamma correction processing, separately. Subsequently, the image data output from the first photoelectric conversion element 150 and those output from the second photoelectric conversion element 160, the elements being adjacent to each other while maintaining a fixed positional relationship, are merged together. An example merging method will be expressed by Equation (1).

$$Sc=\alpha SH+(1-\alpha)SL \quad (1)$$

Here, Sc denotes a composite signal; SH denotes high-sensitivity image data; and SL denotes low-sensitivity image data. In the case of a color image, a composite signal is determined for respective colors: that is, red, green, and blue. α denotes a coefficient to be used for determining a merging ratio and is set to 0<α<1. An α value is determined according to a photographing scene.

The previous descriptions show that the photoelectric conversion sensitivity ratio between the first photoelectric conversion element 150 and the second photoelectric conversion element 160 are set to 4:1. However, at any photoelectric conversion sensitivity ratio, the sensitivity ratio between the high-sensitivity image data and the low-sensitivity image data can be controlled by means of controlling a timing at which the read pulses 161b serving as exposure time control pulses are to be superimposed on the vertical transfer pulse of second phase.

The exposure time of the first photoelectric conversion element 150 may be changed by means of superimposing the exposure time control pulses to the vertical transfer pulses of first phase. In this case, the photoelectric conversion ratio of the first photoelectric conversion element 150 to the second photoelectric conversion element 160 is preferably made sufficiently large in advance (because the photoelectric conversion ratio is required to be larger than the maximum sensitivity ratio of the required image signal).

Figure 4:
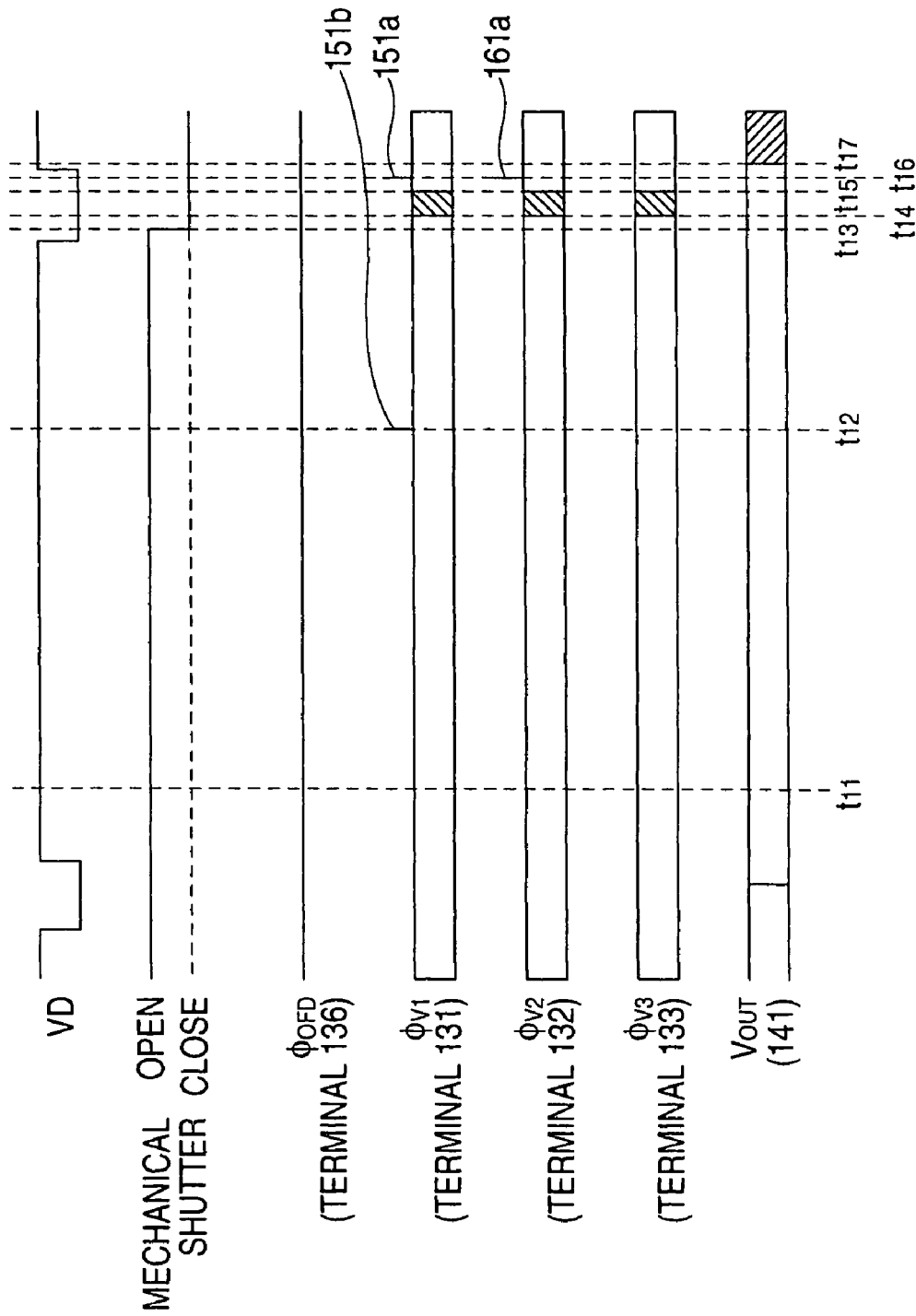
FIG. 4 is a view showing a timing chart for describing another example activation of the solid-state imaging element of the present invention.

Activation of the solid-state imaging element 100 performed when the exposure time control pulse is superimposed on the vertical transfer pulse of first phase will now be described. FIG. 4 shows a timing chart for describing activation of the solid-state imaging element 100 at that time. As does FIG. 3, FIG. 4 shows the vertical synchronous signal VD; the OFD pulse φOFD to be applied to the terminal 136; the drive pulse φv1 to be applied to the terminal 131; the drive pulse φv2 to be applied to the terminal 132; the drive pulse φv3 to be applied to the terminal 133; the output signal Vout; and the open/close state of the mechanical shutter.

Timings t11 and t13 through t17 shown in FIG. 4 are identical with timings t1 and t3 through t7 shown in FIG. 3, and hence explanations thereof will be omitted. Time t12 is a timing at which read pulses 151b are to be superimposed on the vertical transfer pulses of first phase, and the electric charges stored in the first photoelectric conversion element 150 are again discharged at time t12. In this case, the read pulses 151b are exposure time control pulses for changing the exposure time of the first photoelectric conversion element 150 with respect to the exposure time of the second photoelectric conversion element 160.

When the read pulses 151b are not superimposed on the vertical transfer pulses of first phase, there is obtained an image signal having a sensitivity ratio corresponding to the photoelectric conversion sensitivity of the first photoelectric conversion element 150 and that of the second photoelectric conversion element 160. However, as the read pulses 151b are superimposed on the vertical transfer pulses of first phase and the superimposing time is delayed, the sensitivity ratio of an obtained image signal can be reduced.

Figure 5:
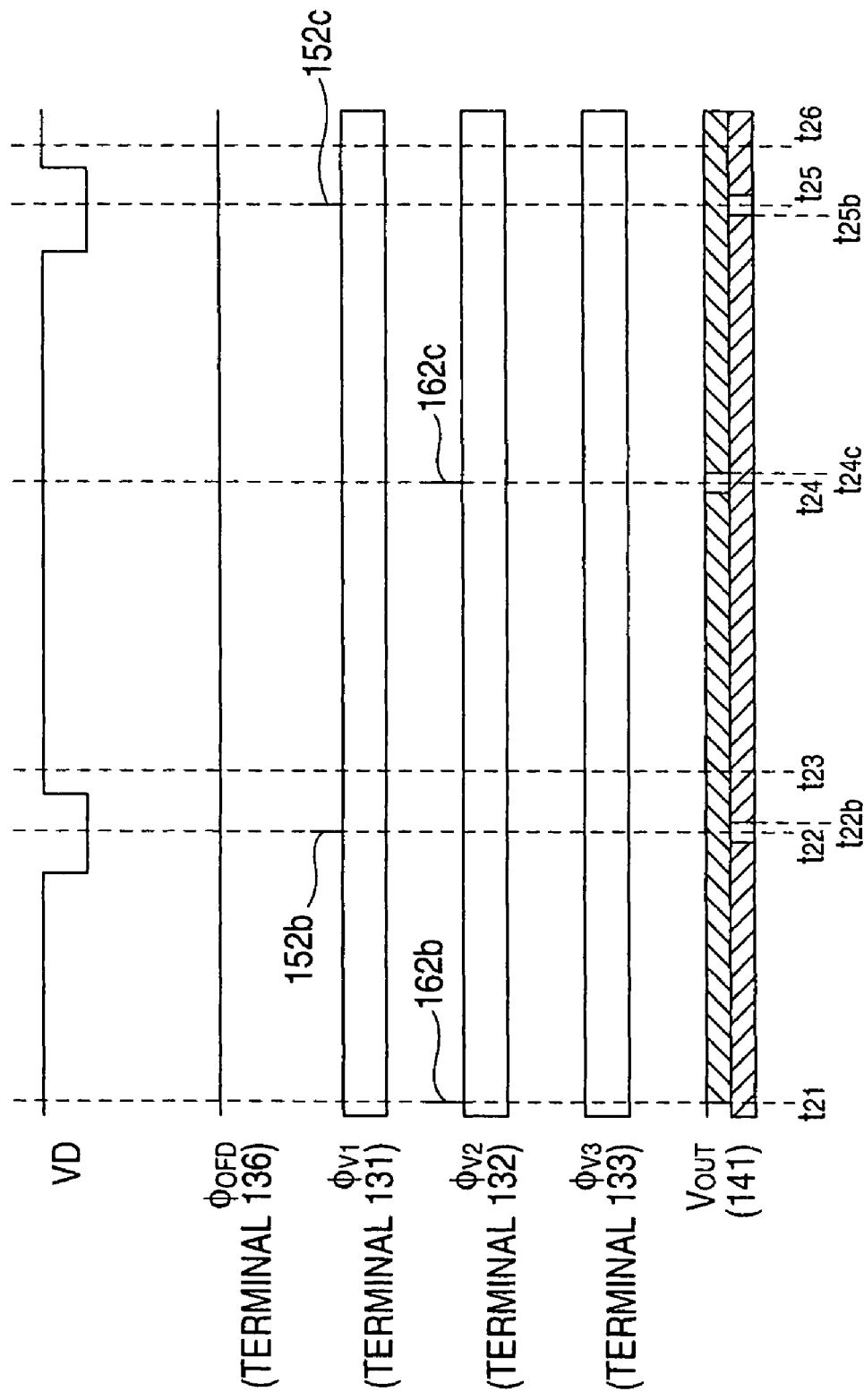
FIG. 5 is a view showing a timing chart for describing still another example activation of the solid-state imaging element of the present invention.

Activation of the solid-state imaging element 100, such as that shown in FIGS. 3 and 4, requires actuation of the mechanical shutter. Explanations will now be given to a case where there is no mechanical shutter or where the mechanical shutter is not actuated as in the case of photographing of motion pictures. FIG. 5 shows a timing chart for describing actuation of the solid-state imaging element 100 performed in that case. FIG. 5 shows the vertical synchronous signal VD; the OFD pulse $\phi_{OFD}$ to be applied to the terminal 136; the drive pulse $\phi_{v1}$ to be applied to the terminal 131; the drive pulse $\phi_{v2}$ to be applied to the terminal 132; the drive pulse $\phi_{v3}$ to be applied to the terminal 133; and the output signal $V_{out}$.

In this embodiment, the OFD pulses $\phi_{OFD}$ are applied to the solid-state imaging element in synchronism with the vertical synchronous signal, whereupon the electric charges stored in the first photoelectric conversion element 150 and those stored in the second photoelectric conversion element 160 are discharged. Storage of electric charges corresponding to the amount of incident light is commenced.

Read pulses 152b, 152c for the first photoelectric conversion element 150 are super imposed on the vertical transfer pulses of first phase in synchronism with the vertical synchronous signal. The electric charges stored in the first photoelectric conversion element 150 are read to the vertical transfer channel during a period between the time when the OFD pulses $\phi_{OFD}$ are subjected to application (time t23, time t26 or the like) and the time when the read pulses 152b, 152c are subjected to superimposition (time t22, t25 or the like). The thus-read electric charges are sequentially transferred to the horizontal transfer section 120 and output from the output section 140 before the next read pulses 152b, 152c are subjected to superimposition.

Read pulses 162b, 162c for the second photoelectric conversion element 160 are superimposed on the vertical transfer pulses of second phase at a preset time (t21, t24 or the like in the present embodiment) between the vertical synchronous signals VD. The electric charges stored in the second photoelectric conversion element 160 are read to the vertical transfer channel during a period between the time when the OFD pulses $\phi_{OFD}$ are subjected to application (time t23, time t26, or the like) and the time when the read pulses 162b, 162c are subjected to superimposition. The thus-read electric charges are sequentially transferred to the horizontal transfer section 120 before the next read pulses 162b, 162c are subjected to superimposition and output from the output section 140. The read pulses 162b, 162c control the exposure time of the second photoelectric conversion element 160.

In the embodiment shown in FIG. 5, the image signal corresponding to the electric charges stored in the first photoelectric conversion element 150 before the read pulses 152b are subjected to superimposition (time t22) is output during a period between t22b and t25b. An output signal Vout corresponding to the electric charges stored in the second photoelectric conversion element 160 during a period from when OFD pulse $\phi_{OFD}$ is applied (time t23) until the read pulses 162c are subjected to superimposition (time t24) is output during a period between time t24c and time t27c (which are not shown; these times correspond to unillustrated read pulses 162d).

As is evident from FIG. 5, the electric charges stored in the second photoelectric conversion element 160 are output faster than those stored in the first photoelectric conversion element 150 by only a given period of time. Hence, the high-sensitivity image data and the low-sensitivity image data, which are based on the electric charges and are shifted from each other by a given period of time, are merged together. The period of time during which the electric charges are output fast corresponds to a period of time from when the read pulses 162b, 162c are subjected to superimposition to when the read pulses 152*b*, 152*c* are subjected to superimposition. This period of time is determined in accordance with the sensitivity ratio of the high-sensitivity image data to the low-sensitivity image data, which are determined in accordance with scenes to be described later. Hence, the digital signal processing section 6 acquires data to be shifted from the system control section 9 and subjects the data to merging operation.

There will now be described scene determination processing to be performed by the system control section 9 and exposure time control processing in which the timing at which the electric charges are to be read from the first photoelectric conversion element 150 or the second photoelectric conversion element 160 to the vertical transfer channel is changed in accordance with the type of a determined scene, thereby changing the exposure time of the first photoelectric conversion element 150 or that of the second photoelectric conversion element 160.

The scene determination processing is performed by means of utilizing the brightness distribution of photographed image data utilized for controlling exposure during photographing operation and autofocus operation. In order to ascertain the brightness distribution, imaging data based on the signal electric charges output the second photoelectric conversion element 160 are utilized. The system control section 9 and the digital signal processing section 3 generate a histogram. The imaging image based on the signal electric charges output from the second photoelectric conversion element 160 are utilized for reasons of acquiring a wide range of brightness values.

Next, a peak in a low brightness side and a peak in a high brightness side are determined from the thus-generated histogram, thereby acquiring brightness values of the respective peaks. A photographing scene for which photographing of wide dynamic range must be performed often assumes a brightness distribution having a peak in the low brightness side and a peak in the high brightness side, as in the case of a scene including an indoor subject and a subject located outside window panes. The sensitivity ratio of the high-sensitivity image data to the low-sensitivity image data is set such that the high-brightness-side brightness range of such a scene becomes an imaging range.

Specifically, under the assumption that the peak value on the low brightness side is located at the center of the brightness range in which the first photoelectric conversion element 150 can perform photographing operation, a required imaging range of the second photoelectric conversion element 160 is determined such that the peak value on the high brightness side comes to the center of the photographable range of the second photoelectric conversion element 160. The sensitivity ratio of the high-sensitivity image data to the low-sensitivity image data is determined on the basis of a ratio of the brightness range, which is double the peak value on the low brightness side, to the required imaging range of the second photoelectric conversion element 160.

When the generated histogram does not have any definite peak, a default sensitivity ratio; e.g., 4:1, is adopted. In this case, assuming that the photoelectric conversion sensitivity between the first photoelectric conversion element 150 and the second photoelectric conversion element 160 is 4:1, as employed as a premise in the descriptions about FIG. 3, a change in exposure time is unnecessary.

The sensitivity ratio of the high-sensitivity image data to the low-sensitivity image data does not need to be set elaborately. Rough setting is sufficient, so long as the sensitivity ratio can be switched in about four levels; that is, 4:1, 8:1, 16:1, and 32:1.

(Second Embodiment)

As the solid-state imaging element 100, there has been used a solid-state imaging element in which the first and second photoelectric conversion elements 150, 160 are activated by means of vertical transfer pulses of three phases and all pixels can be read. However, a solid-state imaging element of interlace type may also be employed, wherein the electric charges stored in the photoelectric conversion elements arranged every other line are read in two frames.

FIG. 6 shows a schematic configuration of a solid-state imaging element according to a second embodiment of the present invention. As in the case of the solid-state imaging element 100 shown in FIG. 1, a solid-state imaging element 200 shown in FIG. 6 converts light intensity into an electric charge signal and stores the thus-converted signal by means of a plurality of photoelectric conversion elements 250, 260 arranged in a square lattice pattern on the surface of a semiconductor substrate in both the direction of a row (i.e., the X direction in FIG. 6) and the direction of a column (i.e., the Y direction in FIG. 6) orthogonal thereto. The solid-state imaging element 200 comprises a vertical transfer section 210 for transferring electric charges output from the photoelectric conversion elements in the direction of a column; a horizontal transfer section 220 for transferring electric charges output from the vertical transfer section 210 in the direction of a row; and an output section 240 for outputting a signal 241 which corresponds to the electric charges to be transferred by the horizontal transfer section 220.

The first photoelectric conversion element 250 stores electric charges to be used for obtaining an image signal of relatively high sensitivity, and the second photoelectric conversion element 260 stores signal electric charges to be used for obtaining an image signal of relatively low sensitivity. The first and second photoelectric conversion elements 250, 260 are arranged in a checked pattern. Since the specific configurations of the respective first and second photoelectric conversion elements are identical with those of the first and second photoelectric conversion elements 150, 160 of the solid-state imaging element 100 shown in FIG. 1, repeated explanations thereof are omitted.

The vertical transfer section 210 is for transferring the electric charges output from the first and second photoelectric conversion elements 250, 260 in the columnar direction. The vertical transfer section 210 comprises a plurality of vertical transfer channels (not shown) formed on the semiconductor substrate; a plurality of vertical transfer electrodes 211 to 214 formed in upper layers above the vertical transfer channels; a first electric charge read region 251 for reading the electric charges from the first photoelectric conversion element 250 to the vertical transfer channel (schematically indicated by an arrow in FIG. 6); and a second electric charge reading region 261 for reading the electric from the second photoelectric conversion element 260 to the vertical transfer channel (schematically indicated by an arrow in FIG. 6).

The vertical transfer section 210 has substantially the same configuration as that of the vertical transfer section 110 of the solid-state imaging element 100 shown in FIG. 1. However, the vertical transfer section 210 differs from the vertical transfer section 110 in terms of the number and arrangement of the vertical transfer electrodes 211 to 214. The vertical transfer electrodes 211 to 214; that is, four electrodes, are provided so as to correspond to two lines of the first and second photoelectric conversion elements 250, 260. Vertical transfer pulses of four phases are applied to the vertical transfer electrodes 211 to 214 by way of terminals 231 through 234, and the electric charges of the vertical transfer channel are transferred in a columnar direction. The vertical transfer pulses are also applied to transfer electrodes 215 through 218 between the vertical transfer section 210 and the horizontal transfer section 220. The electric charges detected by the first photoelectric conversion element 250 and the second photoelectric conversion element 260, which correspond to one line, are transferred to the horizontal transfer section 220 every one cycle of the vertical transfer pulse.

The first electric charge read region 251 is provided at a position which corresponds to the vertical transfer electrodes 211 and 213. Reading of the electric charges from the first photoelectric conversion element 250 to the vertical transfer channel is performed by means of superimposing the read pulses on the vertical transfer pulses of first phase applied to the terminal 231 and vertical transfer pulses of third phase applied to the terminal 233. The second electric charge read region 261 is provided at a position corresponding to the vertical transfer electrodes 212 and 214. Reading of the electric charges from the second photoelectric conversion element 260 to the vertical transfer channel is performed by means of superimposing the read pulses on the vertical transfer pulses of second phase applied to the terminal 232 and the vertical transfer pulses of fourth phase applied to the terminal 234. Consequently, the timing at which the electric charges are to be read from the first photoelectric conversion element 250 to the vertical transfer channel and the timing at which the electric charges are to be read from the second photoelectric conversion element 260 to the vertical transfer channel can be controlled independently.

The horizontal transfer section 220 has the same configuration as that of the horizontal transfer section 120 of the solid-state imaging element 100 shown in FIG. 1 and has horizontal transfer electrodes (not shown) to which horizontal transfer pulses of two phases are applied by way of terminals 235, 236. The solid-state imaging element 200 is also analogous to the solid-state imaging element 100 in that the imaging element has an overflow drain region (not shown) and the electric charges stored in the photoelectric conversion elements 250, 260 are discharged to the semiconductor substrate by application of discharge pulses to an overflow drain electrode terminal 237 as well as in that the output section 240 has a floating diffusion amplifying configuration.

The solid-state imaging element 200 shown in FIG. 6 reads stored signal electric charges, in a separated manner, from the first and second photoelectric conversion elements 250, 260 in odd lines and read from the first and second photoelectric conversion elements 250, 260 in even lines. When the signal electric charges are from the first and second photoelectric conversion elements 250, 260 in odd lines, read pulses are superimposed on the vertical transfer pulses of first phase and the vertical transfer pulses of second phase. The thus-read signal electric charges are output by way of the horizontal transfer section 220. Subsequently, in order to read the signal electric charges of the first and second photoelectric conversion elements 250, 260 in even lines, the read pulses are superimposed on the vertical transfer pulses of third phase and the vertical transfer pulses of fourth phase. The thus-read signal electric charges are output by way of the horizontal transfer section 220 in the same fashion.

In order to control the exposure time of the first photoelectric conversion element 250 or that of the second photoelectric conversion element 260, the OFD pulses $\phi_{OFD}$ and the read pulses to be superimposed during a period in which a mechanical shutter remains closed are superimposed at the same timing (more precisely, are superimposed on the transfer pulses of the same cycle) on the first and second photoelectric conversion elements 250 and 260 in all lines. The solid-state imaging element 200 shown in FIG. 6 can read the signal electric charges stored in the first photoelectric conversion element 250 and those stored in the second photoelectric conversion element 260 in a separated manner. When the signal electric charges are read from the first photoelectric conversion element 250, the read pulses are superimposed on the vertical transfer pulses of first phase and the vertical transfer pulses of third phase. When the signal electric charges are read from the second photoelectric conversion element 260, the read pulses are superimposed on the vertical transfer pulses of second phase and the vertical transfer pulses of fourth phase.

(Third Embodiment)

Figure 7:
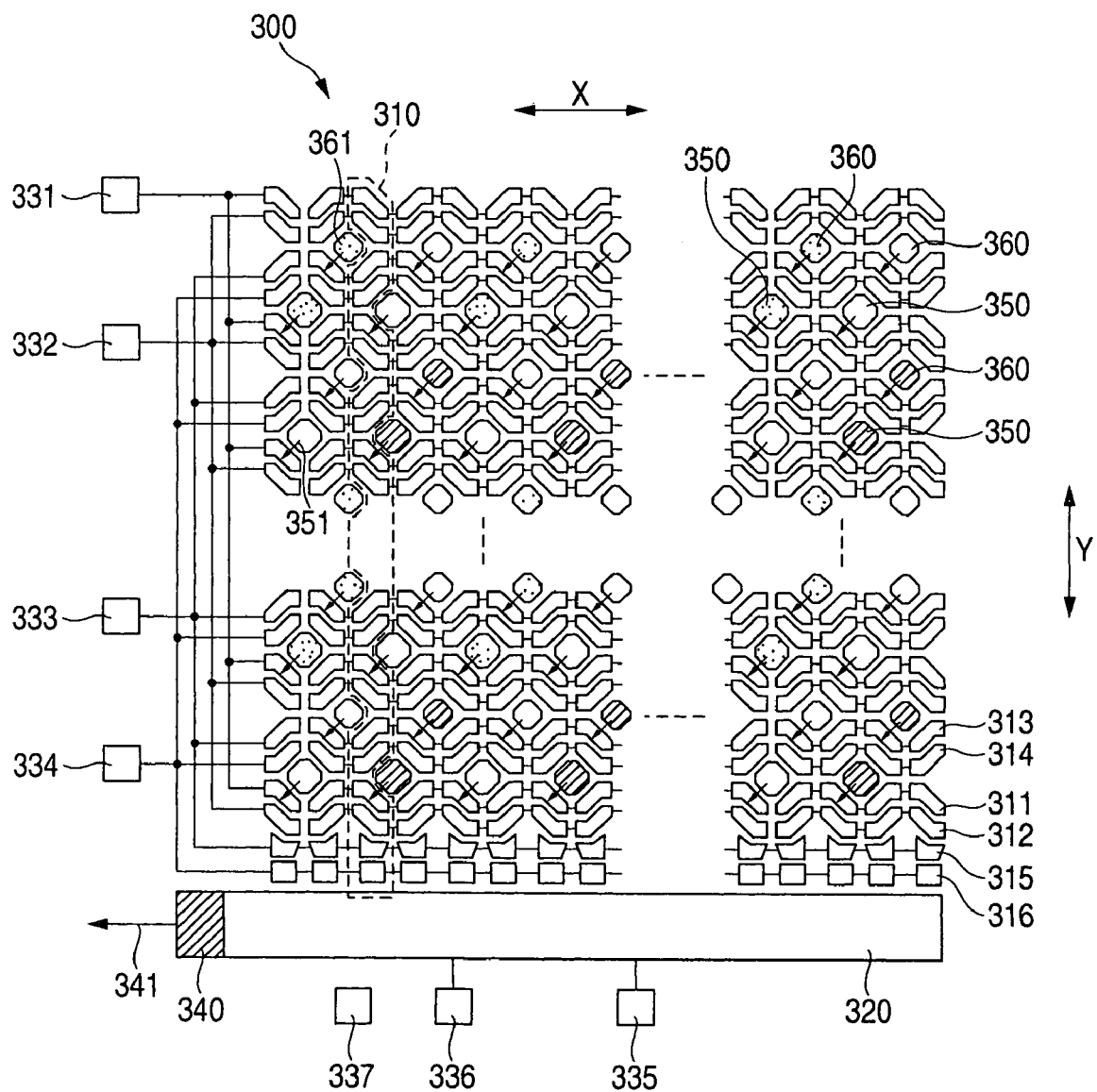
FIG. 7 is a view showing the schematic configuration of a solid-state imaging element according to a third embodiment of the present invention.

The solid-state imaging element in which the photoelectric conversion elements are arranged in a square lattice pattern has been described thus far. However, the pattern is not-limited to a square lattice. FIG. 7 shows the schematic configuration of a solid-state imaging element according to a third embodiment of the present invention. A solid-state imaging element 300 shown in FIG. 7 is a solid-state imaging element of so-called honeycomb structure.

The solid-state imaging element shown in FIG. 7 converts light intensity into an electric charge signal and stores the thus-converted signal by means of a plurality of photoelectric conversion elements 350, 360 (only some of which are labeled with the reference numerals in FIG. 7, and the elements are sometimes described as "pixels") arranged in a square lattice pattern on the surface of a semiconductor substrate in both the direction of a row (an X direction in FIG. 7) and the direction of a column (a Y direction in FIG. 7) orthogonal thereto. The solid-state imaging element 300 comprises a vertical transfer section 310 (only a part of which is labeled the reference numerals in FIG. 7) for transferring electric charges output from the photoelectric conversion elements 350, 360 in the direction of a column; a horizontal transfer section 320 for transfer ring electric charges output from the vertical transfer section 310 in the direction of a row; and an output section 340 for outputting a signal 341 which corresponds to the electric charges to be transferred by the horizontal transfer section 320.

The first and second photoelectric conversion elements 350, 360 are arranged in a square lattice pattern in the direction of a row and the direction of a column orthogonal thereto. The pitch at which the first photoelectric conversion elements 350 are arranged is identical with the pitch at which the second photoelectric conversion elements 360 are arranged. The first and second photoelectric conversion elements 350, 360 are arranged at positions which are offset from each other by half the pitch in both the direction of a row and the direction of a column. In order to change the photoelectric conversion sensitivity of the first photoelectric conversion element 350 and that of the second photoelectric conversion element 360, the areas of the light-receiving surfaces of the photoelectric conversion elements may be changed. Alternatively, the light-gathering area may be changed by means of the microlenses provided at positions above the photoelectric conversion elements. These methods are known, and hence their explanations are omitted.

In order to detect a color image signal, the solid-state imaging element shown in FIG. 7 is provided with color filters (not shown) provided at positions above the first and second photoelectric conversion elements 350, 360. A method for arranging the color filters is arbitrary, but the same color is assigned to the first and second photoelectric conversion elements 350, 360 positioned adjacent to each other while a fixed positional relationship is maintained therebetween. In FIG. 7, the color filters are arranged in a Bayer arrangement for the respective first and second photoelectric conversion elements 350, 360. Corresponding photoelectric conversion elements detect electric charges corresponding to red light, green light, and blue light.

The vertical transfer section 310 transfers the electric charges from the first and second photoelectric conversion elements 350, 360 in the direction of a column. The vertical transfer section 310 comprises a plurality of vertical transfer channels (not shown) formed in the semiconductor substrate; a plurality of vertical transfer electrodes 311 to 314 formed so as to cross the vertical transfer channels when viewed in the plane; electric charge reading regions 351 for reading the electric charges of the first photoelectric conversion elements 350 into the vertical transfer channel (diagrammatically indicated by an arrow in FIG. 7); and electric charge reading regions 361 for reading the electric charges of the second photoelectric conversion elements 360 into the vertical transfer channel (diagrammatically indicated by the arrow in FIG. 7).

The vertical transfer channel is a region which wholly extends in a meandering pattern in the direction of a column between the first and second photoelectric conversion elements 350, 360. The vertical transfer electrodes 311 through 314 formed in the layer above the vertical transfer channel divide regions where the electric charges are transferred and stored. The four vertical transfer electrodes 311 through 314 are provided so as to correspond to the first and second photoelectric conversion elements 350, 360 (in FIG. 7, only the first and second photoelectric conversion elements corresponding to the vertical transfer electrodes 311 through 314 located in one column are labeled with the reference numerals). The vertical transfer electrodes assume a meandering shape, in which the electrodes wholly extend in the direction of a row between the first and second photoelectric conversion elements 350, 360. The regions where the electric charges are transferred are depicted as being connected in FIG. 7. However, in reality, the regions are formed from conductors having substantially the same width.

Vertical transfer pulses of four phases are applied to the vertical transfer electrodes 311 through 314 by way of terminals 331 through 334, and the electric charges stored in the vertical transfer channel are transferred in the direction of a column. The vertical transfer pulses are also applied to transfer electrodes 315, 316 existing between the vertical transfer section 310 and the horizontal transfer section 320. The electric charges detected by the first and second photoelectric conversion elements 350, 360 located in one row are transferred to the horizontal transfer section 320 every cycle of a vertical transfer pulse.

The first electric charge reading regions 351 are provided at positions corresponding to the vertical transfer electrodes 311. Reading of electric charges from the first photoelectric conversion elements 350 to the vertical transfer channel is performed by means of superimposing a read pulse on a vertical transfer pulse of first phase to be applied to the terminals 331. The second electric charge reading regions 361 are provided at positions corresponding to the vertical transfer electrode 313. Reading of electric charges from the second photoelectric conversion elements 360 to the vertical transfer channel is performed by means of superimposing the read pulse on the vertical transfer pulse of third phase to be applied to the terminals 333. Therefore, a timing at which the electric charges are to be read from the first photoelectric conversion elements 350 to the vertical transfer channel and a timing at which the electric charges are to be read from the second photoelectric conversion elements 360 to the vertical transfer channel can be controlled independently.

The horizontal transfer section 320 transfers the electric charges from the vertical transfer section 310 in the direction of a row and includes a horizontal transfer channel and a horizontal transfer electrode (neither of which is shown). Horizontal transfer pulses of two phases are applied to the horizontal transfer electrode by way of terminals 335, 336. The signal electric charges that are from the photoelectric conversion elements 350, 360 provided in one row and have been transferred from the vertical transfer section 310 are transferred to the output section 340. The output section 340 has a floating diffusion amplifier configuration and outputs the voltage signal 341 corresponding to the transferred electric charge.

The solid-state imaging element 300 shown in FIG. 7 has an overflow drain region (not shown) which discharges the electric charges stored in the photoelectric conversion elements 350, 360. When the discharged pulse is applied to an overflow drain electrode terminal 337, the electric charges stored in the photoelectric conversion elements 350, 360 are discharged to the semiconductor substrate. A pulse is applied to the overflow drain electrode terminal 337 at a predetermined timing in response to operation of a release button, thereby controlling a time during which the electric charges are stored in the photoelectric conversion elements 350, 360.

Although not shown in FIG. 7, a channel stopper is formed between the vertical transfer channels. Although illustrated in FIG. 7 as being comparable in size with the first and second photoelectric conversion elements 350, 360, the vertical transfer electrodes 331 through 334 are actually much smaller.

The solid-state imaging element 300 shown in FIG. 7 is described by reference to FIGS. 3 through 5, and the solid-state imaging element 300 can perform the same operation as does the solid-state imaging element 100. For instance, when such an operation as shown in FIG. 3 is to be performed, the read pulses are superimposed on the vertical transfer pulses of third phase to be applied to the terminal 333, on the assumption that the read pulses correspond to the read pulses 161b superimposed on the vertical transfer pulses of second phase to control the exposure time. Further, the read pulses are superimposed on the vertical transfer pulses of first phase applied to the terminal 331 on the assumption that the read pulses correspond to the read pulses 151a originating from the signal electric charges of the first photoelectric conversion element 150. Read pulses are superimposed on the vertical transfer pulses of third phase applied to the terminal 333 on the assumption that the read pulses correspond to the read pulses 161a originating from the signal electric charges of the second photoelectric conversion element 160.

As is evident from the foregoing descriptions, according to the present invention, there can be provided a solid-state imaging element which can change the sensitivity ratio of the high-sensitivity pixel to the low-sensitivity pixel. There can also be provided an imaging device capable of changing a dynamic range according to a photographing scene.

The entire disclosure of each and every foreign patent application from which the benefit of foreign priority has been claimed in the present application is incorporated herein by reference, as if fully set forth.

What is claimed is:

1. An imaging device, comprising:
a solid-state imaging element comprising:
a semiconductor substrate;
a plurality of photoelectric conversion elements forming a square lattice pattern extending in a column direction and in a row direction, wherein the square lattice pattern comprises a plurality of sets, each comprising a subset of said photoelectric conversion elements arranged in one of the column direction and the row direction, on a surface of the semiconductor substrate;
a vertical transfer section that transfers to the column direction an electric charge from said photoelectric conversion elements, to form an electric charge from the vertical transfer section;
a horizontal transfer section that transfers to the row direction the electric charge from the vertical transfer section, to form an electric charge transferred from the horizontal transfer section; and
an output section that outputs a signal corresponding to the electric charge transferred from the horizontal transfer section, wherein the subsets of said photoelectric conversion elements comprise:
a plurality of first photoelectric conversion elements that store a first signal electric charge, the first signal electric charge being used for obtaining an image signal having a comparatively higher sensitivity; and
a plurality of second photoelectric conversion elements that store a second signal electric charge, the second signal electric charge being used for obtaining an image signal having a comparatively lower sensitivity,
wherein the vertical transfer section comprises:
a plurality of vertical transfer channels in the semiconductor substrate, each of the vertical transfer channels corresponding to each of the subsets of said photoelectric conversion elements arranged in the column direction;
a plurality of vertical transfer electrodes arranged to substantially cross the vertical transfer channels when viewed from a vertical direction to a plane of the semiconductor substrate; and
a plurality of electric charge reading regions that read out to the vertical transfer channels, the electric charge from said photoelectric conversion elements,
wherein each of said photoelectric conversion elements corresponds to one of the vertical transfer electrodes,
wherein the plurality of the electric charge reading regions comprise:
a plurality of first electric charge reading regions corresponding to the plurality of the first photoelectric conversion elements; and
a plurality of second electric charge reading regions corresponding to the plurality of the second photoelectric conversion elements, and wherein the vertical transfer electrodes comprise:
a plurality of first vertical transfer electrodes corresponding to the first electric charge reading regions; and a plurality of second vertical transfer electrodes corresponding to the second electric charge reading regions, in which the first vertical transfer electrodes are positioned at positions different from the second vertical transfer electrodes,
wherein said imaging device further comprises: an exposure time control section that changes an exposure time of the first photoelectric conversion elements and an exposure time of the second photoelectric conversion elements; and a signal processing section that processes a signal on the basis of an imaging signal output from the solid-state imaging element,
wherein signal processing to be performed by the signal processing section includes merging operation for generating a composite signal of a high sensitivity image signal originating from a signal output from the first photoelectric conversion element and a low sensitivity image signal originating from a signal output from the second photoelectric conversion element, and
wherein the exposure time control section determines a type of a photographing scene and changes the exposure time of the first photoelectric conversion element and the exposure time of the second photoelectric conversion element by making a timing at which an electric charge is to be read to the vertical transfer channels from the first photoelectric conversion elements different from a timing at which an electric charge is to be read to the vertical transfer channels from the second photoelectric conversion elements.

2. The imaging device according to claim 1,
wherein a read pulse to be used for instructing reading of an electric charge within the plurality of electric charge reading regions includes an exposure time control pulse applied to one of the first photoelectric conversion elements and the second photoelectric conversion elements; and
wherein the exposure time control pulse is for discharging, to the outside, an electric charge which has been stored in the plurality of photoelectric conversion elements before appearance of the exposure time control pulse, by way of the vertical transfer channels.

3. The imaging device according to claim 1,
wherein a read pulse to be used for instructing reading of an electric charge within the plurality of electric charge reading regions includes:
a first exposure time control pulse for performing reading operation in the plurality of first photoelectric conversion elements; and
a second exposure time control pulse for performing reading operation in the plurality of second photoelectric conversion elements, in which the first and second exposure time control pulses appear at different times, and wherein the first exposure time control pulse is for reading, into the vertical transfer channels, an electric charge which have been stored in the plurality of first photoelectric conversion elements before appearance of the first exposure time control pulse, as the first signal electric charge, and
wherein the second exposure time control pulse is for reading, into the vertical transfer channels, an electric charge which have been stored in the plurality of second photoelectric conversion elements before appearance of the second exposure time control pulse, as the second signal electric charge.

4. The imaging device according to claim 1, wherein one of the first photoelectric conversion elements and the second photoelectric conversion elements is arranged in a checkered pattern, when viewed from a vertical direction to a plane of the semiconductor substrate.

5. The imaging device according to claim 1, wherein each first photoelectric conversion element with sensitivity to a color is adjacent to at least one second photoelectric conversion element with sensitivity to the same color.

6. The imaging device according to claim 1, wherein the exposure time control section obtains a brightness distribution of the photographing scene and determines the type of the photographing scene based on the determined brightness distribution.

7. The imaging device according to claim 1,
wherein a portion of the first photoelectric conversion elements and a portion of the second photoelectric conversion elements are configured to be sensitive to a same color, and
wherein the portion of the first photoelectric conversion elements and the portion of the second photoelectric conversion elements are configured to have different luminance sensitivities to the same color.

8. An imaging device, comprising:
a solid-state imaging element comprising:
a semiconductor substrate;
a plurality of photoelectric conversion elements forming a square lattice pattern extending in a column direction and in a row direction, wherein the square lattice pattern comprises a plurality of sets, each comprising a subset of said photoelectric conversion elements arranged in one of the column direction and the row direction, on a surface of the semiconductor substrate;
a vertical transfer section that transfers to the column direction an electric charge from said photoelectric conversion elements, to form an electric charge from the vertical transfer section;
a horizontal transfer section that transfers to the row direction the electric charge from the vertical transfer section, to form an electric charge transferred from the horizontal transfer section; and
an output section that outputs a signal corresponding to the electric charge transferred from the horizontal transfer section, wherein the subsets of said plurality of photoelectric conversion elements comprise:
a plurality of first photoelectric conversion elements that store a first signal electric charge, the first signal electric charge being used for obtaining an image signal having a comparatively higher sensitivity; and
a plurality of second photoelectric conversion elements that store a second signal electric charge, the second signal electric charge being used for obtaining an image signal having a comparatively lower sensitivity,
wherein the plurality of first photoelectric conversion elements form a first square lattice pattern extending in the column direction and in the row direction,
wherein the plurality of second photoelectric conversion elements form a second square lattice pattern extending in the column direction and in the row direction,
wherein the plurality of first photoelectric conversion elements and the plurality of second photoelectric conversion elements are arranged at a common pitch in the first square lattice pattern and the second square lattice pattern, respectively,
wherein the plurality of first photoelectric conversion elements and the plurality of second photoelectric conversion elements are shifted each other by half of the pitch in both the column direction and the row direction,
wherein the vertical transfer section comprises:
a plurality of vertical transfer channels in the semiconductor substrate, each of the vertical transfer channels corresponding to each of the subsets of said photoelectric conversion elements arranged in the column direction;
a plurality of vertical transfer electrodes arranged to substantially cross the vertical transfer channels when viewed from a vertical direction to a plane of the semiconductor substrate; and
a plurality of electric charge reading regions that read out to the vertical transfer channels, the electric charge from said photoelectric conversion elements,
wherein each of the vertical transfer channels assumes a shape which wholly extends in a meandering pattern in the column direction between the photoelectric conversion elements,
wherein each of the photoelectric conversion elements corresponds to one of the vertical transfer electrodes, each of the vertical transfer electrodes assuming a shape which wholly extends in a meandering pattern in the row direction between the photoelectric conversion elements,
wherein the plurality of the electric charge reading regions comprise:
a plurality of first electric charge reading regions corresponding to the plurality of the first photoelectric conversion elements; and
a plurality of second electric charge reading regions corresponding to the plurality of the second photoelectric conversion elements, and wherein the vertical transfer electrodes comprise:
a plurality of first vertical transfer electrodes corresponding to the first electric charge reading regions; and
a plurality of second vertical transfer electrodes corresponding to the second electric charge reading regions, in which the first vertical transfer electrodes are positioned at positions different from the second vertical transfer electrodes,
wherein said imaging device further comprises: an exposure time control section that changes an exposure time of the first photoelectric conversion elements and an exposure time of the second photoelectric conversion elements; and a signal processing section that processes a signal on the basis of an imagine signal output from the solid-state imaging element,
wherein signal processing to be performed by the signal processing section includes merging operation for generating a composite signal of a high sensitivity image signal originating from a signal output from the first photoelectric conversion element and a low sensitivity image signal originating from a signal output from the second photoelectric conversion element, and
wherein the exposure time control section determines a type of a photographing scene and changes the exposure time of the first photoelectric conversion element and the exposure time of the second photoelectric conversion element by making a timing at which an electric charge is to be read to the vertical transfer channels from the first photoelectric conversion elements different from a timing at which an electric charge is to be read to the vertical transfer channels from the second photoelectric conversion elements.

9. The imaging device according to claim 8,
wherein a read pulse to be used for instructing reading of an electric charge within the plurality of the electric charge reading regions includes a first exposure time control pulse applied to the first photoelectric conversion elements and a second exposure time control pulse applied to the second photoelectric conversion elements in which appearance timings of the first exposure time control pulse and the second exposure time control pulse change in accordance with an imaging scene, and wherein each of the first and second exposure time control pulses is for discharging, to the outside, an electric charge which has been stored in the plurality of photoelectric conversion elements before appearance of the exposure time control pulse, by way of the vertical transfer channels.

10. The imaging device according to claim 8, wherein the first exposure time control pulse is for reading, into the vertical transfer channels, an electric charge which has been stored in the plurality of first photoelectric conversion elements before appearance of the first exposure time control pulse, as the first signal electric charge, and wherein the second exposure time control pulse is for reading, into the vertical transfer channels, an electric charge which has been stored in the plurality of second photoelectric conversion elements before appearance of the second exposure time control pulse, as the second signal electric charge.

11. The imaging device according to claim 8, wherein each first photoelectric conversion element with sensitivity to a color is adjacent to at least one second photoelectric conversion element with sensitivity to the same color.

12. The imaging device according to claim 8, wherein the exposure time control section obtains a brightness distribution of the photographing scene and determines the type of the photographing scene based on the determined brightness distribution.

13. The imaging device according to claim 8, wherein a portion of the first photoelectric conversion elements and a portion of the second photoelectric conversion elements are configured to be sensitive to a same color, and wherein the portion of the first photoelectric conversion elements and the portion of the second photoelectric conversion elements are configured to have different luminance sensitivities to the same color.

* * * * *